Feb. 12, 1952 E. M. CREAMER, JR 2,585,093
TRIANGULAR PULSE GENERATOR
Filed April 28, 1948
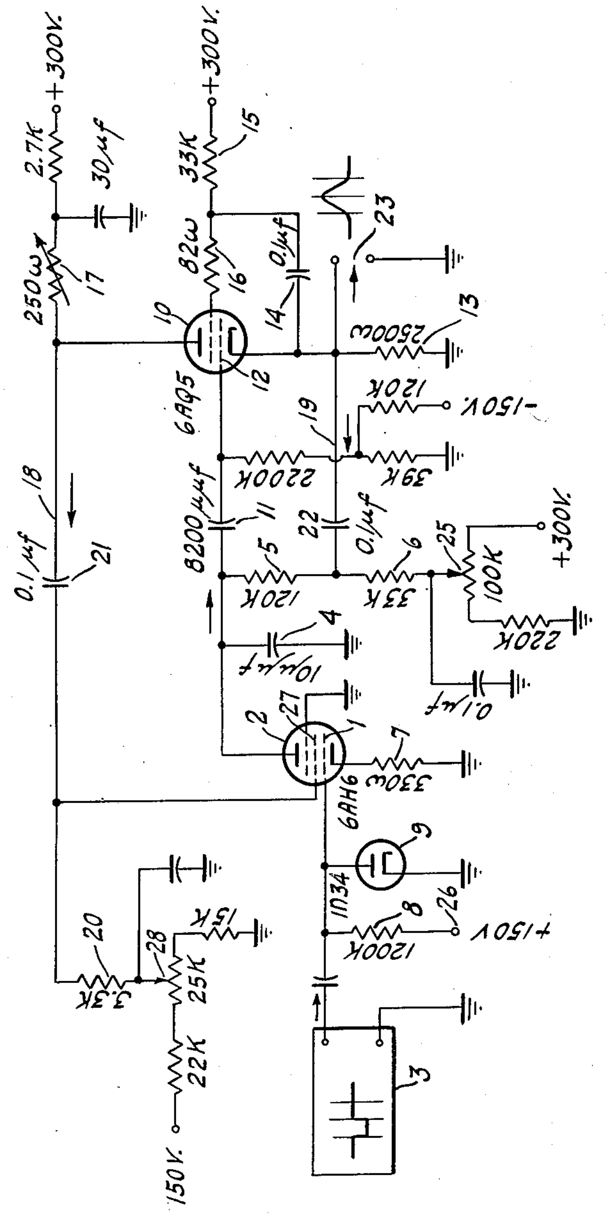
INVENTOR.
EDGAR M. CREAMER, JR.
BY
Brown, Denk & Synnestvedt
AGENTS Patented Feb. 12, 1952 2,585,093

UNITED STATES PATENT OFFICE 2,585,093

TRIANGULAR PULSE GENERATOR

Edgar M. Creamer, Jr., Philadelphia, Pa., assignor to Philco Corporation, Philadelphia, Pa., a corporation of Pennsylvania Application April 28, 1948, Serial No. 23,681

4 Claims. (Cl. 250—27)

The present invention relates to pulse generators, and, more particularly, to generators of time-spaced pulses of triangular wave shape.

Pulse generators of the type described herein are useful wherever time-spaced triangular pulses of precise waveform are required. A typical use for such triangular pulses is described, for example, in a copending application of Wilson P. Boothroyd, Serial No. 14,691, filed March 13, 1948. That application discloses a system for generating trains of triangular keying pulses which may be used in selecting, sequentially, the various individual channels of a multiplex pulse communication system. The copending application discloses but does not claim the present invention.

It is a principal object of the present invention to provide an improved generator capable of producing electrical pulses of triangular waveform.

It is a further object of the invention to provide an electrical pulse generator capable of developing time-spaced triangular pulses having linear leading and lagging portions.

It is still another object of the invention to provide an electrical pulse generator capable of generating time-spaced triangular pulses whose rates of rise and fall are substantially equal.

These and other objects of the invention, and the manner in which they are attained, will appear from the following detailed description and accompanying drawing, the single figure of which is a schematic illustration of a triangular pulse generator embodying the invention.

In general, the pulse generator illustrated in the drawing comprises a source 3 of substantially rectangular pulses, a vacuum tube 2 and associated circuits adapted to charge and discharge the capacitor 4 in response to the pulse voltage supplied by the source 3, a cathode follower output stage comprising, inter alia, the vacuum tube 10 across whose cathode load resistance 13 the triangular pulses are developed, and feedback paths 18 and 19 which feed energy back from the cathode follower stage 10 to the circuits associated with the vacuum tube 2. The function of the feedback paths is, principally, to linearize the leading and lagging portions of the developed triangular pulses. In the above-identified copending application the cathode load resistance 13, referred to above, is comprised of the shunt combination of a one-tenth megohm resistor and a delay line having a characteristic impedance of approximately 2500 ohms. The specific character of the load resistance 13 is, of course, of no substantial importance in the present application.

Referring now to the system in greater detail, there is provided a capacitor 4 which is charged to a positive potential from a source of voltage whose magnitude may be controlled by the potentiometer 25. The charging current from this source flows into the capacitor 4 through the serially-connected resistors 6 and 5, the rate of charge being determined principally by the magnitude of the resistor 5. The effect of resistor 6 on the rate of charge is negligible in view of the bypassing effect of the shunt path comprising the condenser 22 and the cathode load impedance 13. The capacitor 4 is discharged through the pentode 2 which is normally in a conductive state, being rendered non-conductive only when a negative potential is applied to its control grid 1. Grid 1 is normally held at substantially ground potential by means of the diode 9 which is connected between ground and the junction of grid 1 and resistor 8. The lower end of resistor 8 is connected to a source 26 of positive voltage, the purpose of which is to prevent the grid 1 from becoming negative with respect to ground under normal conditions. The resistance of resistor 8 is so high relative to the internal resistance of diode 9 that the grid 1 of pentode 2 is normally only a fraction of a volt above ground potential. The diode 9 may, of course, be a fixed crystal rectifier if desired.

Rectangular pulses of negative polarity are applied to the control grid 1 of pentode 2 from the pulse source 3. The length, or time duration, of these pulses should be substantially half the length of triangular pulses to be generated. As will be apparent hereinafter, the negative pulse controls the length of the rising portion of the generated triangular pulse. Between pulses the pentode 2 is conductive and, in combination with the resistors 5, 6, and 7, acts to apply a predetermined potential across condenser 4. When a negative pulse is applied to the control grid 1 of pentode 2, the said pentode is rendered non-conductive. The potential across capacitor 4 then rises as the capacitor is charged through resistor 5. When pentode 2 again becomes conductive, at the end of the pulse, the potential across condenser 4 return to the value which it has between pulses.

Tetrode 10 is supplied with the potential appearing across condenser 4. This potential is applied through blocking condenser 11 to the control grid 12 of tetrode 10. Tetrode 10, connected in a cathode follower circuit, provides the output voltage of the system across its cathode load resistor 13. The value of the potential applied between the screen and the cathode of tetrode 10 is maintained relatively constant by means of the bypass condenser 14 connected between the cathode and the screen grid. The screen grid is energized through a filter resistor 15. The additional screen resistor 16 provides a small degree of screen-circuit degeneration and is effective to prevent parasitic oscillations. The plate circuit of tetrode 10 is supplied with plate current through a variable resistor 17.

It will be evident from the description set forth above that the apparatus, as thus far described, will tend to produce an exponential rising wave followed by an exponential falling wave, the rates of rise and fall being different, due to the fact that the pentode 2 is cut off during the rising portion but is conductive during the falling portion. Accordingly, if a triangular pulse of high precision is to be obtained, it is necessary to provide means for adjusting the rates of rise and fall of the triangle to substantial equality and, in addition, to linearize both the rising and falling portion of the wave. The feedback connections described below, in cooperation with the electrode supply impedances, provide the necessary controls.

Feedback connections 18 and 19 are included between tetrode 10 and pentode 2 to linearize the rise and fall of the potential across capacitor 4. The voltage fed back from the cathode load impedance 13 of tetrode 10 to the junction between resistors 5 and 6 by way of connection 19 serves to modify the effective plate supply voltage supplied to the pentode 2 during the time when a triangular pulse is being formed. This feedback circuit is relied upon to linearize the rising slope of the triangular pulse. It will be apparent that, as the potential on the anode of tube 2 rises, the potential at the junction of resistors 5 and 6 will rise by approximately the same amount so that the potential across the resistor 5 remains substantially constant. It follows then that the current through the said resistor, as well as the charging current through the said resistor, as well as the charging current into the capacitor 4, will remain substantially constant, and hence the voltage across the capacitor 4 rises very linearly throughout the charging period.

The screen grid 27 of pentode 2 is supplied with potential through resistor 20. The potentiometer 28 sets the normal operating voltage of the screen 27 and thus controls the magnitude of the plate current of pentode 2 during the time that it is conducting. The setting of potentiometer 28 thus has an effect on the rate of fall of the triangular pulse, but it has no effect on the rise, because pentode 2 is cut off during the pulse rise interval. Potentiometer 28 is preferably adjusted to that point where the rates of pulse fall and pulse rise are substantially equal. In addition, a negative triangular pulse corresponding in time to the output pulse developed across cathode load resistor 13, but of reduced amplitude, is fed back through connection 18 and condenser 21 to the screen grid 27 of pentode 2, to control the linearity of the falling portion of the triangular pulse. This it does by varying the plate resistance of the pentode 2 in such a way that the rate of discharge, and hence the falling slope of the generated pulse, remains substantially constant.

When using the values suggested in the drawing, or any other suitable set of parameters, it will be found that the adjustable elements referred to above may be so adjusted that the output voltage developed across resistor 13, and available at the output terminals 23, will be very nearly a perfect triangular wave.

Although I have described my invention with particular reference to one particular embodiment, it will be apparent to those skilled in the art that the invention is capable of other forms of physical expression.

I claim:

1. In a circuit for generating triangular pulses: a capacitor, a source of unidirectional potential, a resistive network connecting said source to said capacitor, a control device connected in shunt with said capacitor, means rendering said device alternately non-conducting and conducting whereby said capacitor tends to charge when said control device is non-conducting and to discharge when said control device is conducting, an amplifier having its input terminals connected across said capacitor, a first feedback circuit extending between an output circuit of said amplifier and said resistive network for rendering more constant the rate of charge of said capacitor, and a second feedback circuit extending between a further output circuit of said amplifier and said control device for modifying the conduction characteristics of the latter for rendering more constant the rate of discharge of said capacitor.

2. A circuit for generating triangular pulses having substantially equal rise and fall times, said circuit comprising: a capacitor; a source of unidirectional potential; a resistive network connecting said source to said capacitor; a vacuum tube having at least a cathode, a control grid, a screen grid and an anode, the anode-cathode circuit of said tube being connected in shunt with said capacitor; means connected to said control grid for rendering said tube alternately non-conducting and conducting, whereby said capacitor tends to charge when said tube is non-conducting and to discharge when said tube is conducting; an amplifier having its input terminals connected across said capacitor; a first feedback connection between an output circuit of said amplifier and said resistive network, said connection providing feedback in the same polarity as the potential change across said capacitor; and a second feedback connection between an output circuit of said amplifier and the screen grid of said vacuum tube, said second feedback connection providing a feedback voltage which is in a polarity opposite to that provided by said first feedback connection.

3. A circuit for generating triangular pulses, comprising: a capacitor; a source of unidirectional voltage; a resistive network connecting said capacitor across said source; a vacuum tube having at least a cathode, an anode, and a control grid, the anode-cathode circuit of said tube being connected in shunt with said capacitor; means including a source of pulse signals for rendering said tube alternately non-conducting and conducting, whereby said capacitor tends to charge when said tube is non-conducting and to discharge when said tube is conducting; means for varying the internal impedance of said tube to equalize the rates of charge and discharge of said capacitor; an amplifier stage having its input terminals connected across said capacitor; a first feedback circuit extending between an output circuit of said amplifier stage and said resistive network for rendering substantially constant the rate of charge of said capacitor, and a second feedback circuit extending between a further output circuit of said amplifier stage and said vacuum tube for modifying the conduction characteristics of the latter to render substantially constant the rate of discharge of said capacitor.

4. A circuit for generating triangular pulses as claimed in claim 3, characterized in that said first feedback circuit is effective principally during the capacitor-charging time and said second feedback circuit is effective solely during the discharge time.

EDGAR M. CREAMER, Jr.

REFERENCES CITED

The following references are of record in the file of this patent:

UNITED STATES PATENTS

| Number | Name | Date |
|---|---|---|
| 2,126,243 | Busse et al. | Aug. 9, 1938 |
| 2,173,427 | Scott | Sept. 19, 1939 |
| 2,237,425 | Geiger et al. | Apr. 8, 1941 |
| 2,241,256 | Gould | May 6, 1941 |
| 2,346,396 | Rider | Apr. 11, 1944 |
| 2,413,063 | Miller | Dec. 24, 1946 |
| 2,462,024 | Johnson | Feb. 15, 1949 |